(12) United States Patent
Domlatil

(10) Patent No.: US 11,577,206 B2
(45) Date of Patent: Feb. 14, 2023

(54) DEVICE FOR TREATING A PRODUCT

(71) Applicant: Inotec GmbH Maschinenentwicklung Und Vertrieb, Reutlingen (DE)

(72) Inventor: Miroslav Domlatil, Reutlingen (DE)

(73) Assignee: Inotec GmbH Maschinenentwicklung Und Vertrieb, Reutlingen (DE)

( * ) Notice: Subject to any disclaimer, the term of this patent is extended or adjusted under 35 U.S.C. 154(b) by 265 days.

(21) Appl. No.: 16/753,832

(22) PCT Filed: Oct. 4, 2018

(86) PCT No.: PCT/EP2018/076968
§ 371 (c)(1),
(2) Date: Apr. 6, 2020

(87) PCT Pub. No.: WO2019/068793
PCT Pub. Date: Apr. 11, 2019

(65) Prior Publication Data
US 2020/0282368 A1 Sep. 10, 2020

(30) Foreign Application Priority Data
Oct. 5, 2017 (DE) ...................... 10 2017 123 164.1

(51) Int. Cl.
*B22C 5/00* (2006.01)
*B01F 27/60* (2022.01)
(Continued)

(52) U.S. Cl.
CPC ........ *B01F 27/627* (2022.01); *A22C 17/0033* (2013.01); *B01F 27/091* (2022.01);
(Continued)

(58) Field of Classification Search
CPC .................................................. B01F 35/7548
See application file for complete search history.

(56) References Cited

U.S. PATENT DOCUMENTS

| 276,646 | A | * | 5/1883 | Thorpe | ................... | B01F 29/64 366/222 |
| 2,784,950 | A | | 3/1957 | Bakewell | | |

(Continued)

FOREIGN PATENT DOCUMENTS

| DE | 82119 C | 8/1894 |
| DE | 3812931 A1 | 10/1989 |

(Continued)

OTHER PUBLICATIONS

Google machine translation "FR-2870675-A1" (Year: 2005).*
(Continued)

*Primary Examiner* — Anshu Bhatia
*Assistant Examiner* — Gregory Y Huan
(74) *Attorney, Agent, or Firm* — Bachman & LaPointe, P.C.

(57) ABSTRACT

At a device for treating a product in a receiving trough (1) which has at least one opening (5) for receiving the product, the treatment of the product is to take place by inner and outer blades (9, 8) which are arranged in the receiving trough (1) and can be driven separately by drives (14; 16). The drive (14) for the at least one inner blade (9) should be located on the same side of the receiving trough (1) as the drive (16) for the at least one outer blade (8).

9 Claims, 4 Drawing Sheets

(51) Int. Cl.
  *A22C 17/00* (2006.01)
  *B01F 27/091* (2022.01)
  *B01F 27/726* (2022.01)
  *B01F 35/45* (2022.01)
  *B01F 35/41* (2022.01)
  *B01F 35/71* (2022.01)
  *B01F 35/75* (2022.01)
  *B01F 101/06* (2022.01)

(52) U.S. Cl.
  CPC ........ *B01F 27/726* (2022.01); *B01F 35/4122* (2022.01); *B01F 35/451* (2022.01); *B01F 35/7173* (2022.01); *B01F 35/7548* (2022.01); *B01F 2101/06* (2022.01)

(56) References Cited

U.S. PATENT DOCUMENTS

| | | | |
|---|---|---|---|
| 2,957,681 A | 10/1960 | William | |
| 3,722,834 A | 3/1973 | Bakewell | |
| 4,509,860 A | 4/1985 | Lasar, III | |
| 2012/0069699 A1* | 3/2012 | Balnoschan | A21C 1/06 366/218 |

FOREIGN PATENT DOCUMENTS

| | | | | |
|---|---|---|---|---|
| DE | 56006 | | 4/1991 | |
| DE | 4341569 A1 | * | 6/1995 | ............... A22C 5/00 |
| DE | 4341569 C2 | | 12/1995 | |
| DE | 19507181 A | | 9/1996 | |
| DE | 19507181 A1 | * | 9/1996 | .......... B01F 13/1044 |
| DE | 102010055800 | | 6/2012 | |
| EP | 0191119 B1 | | 10/1988 | |
| EP | 569854 A1 | * | 11/1993 | ............... A22C 5/00 |
| EP | 3138404 A1 | * | 3/2017 | ............. A21C 1/006 |
| EP | 3138404 A1 | | 3/2017 | |
| FR | 410319 A | | 5/1910 | |
| FR | 2870675 A1 | | 12/2005 | |
| FR | 2870675 A1 | * | 12/2005 | ............... A21C 1/06 |
| JP | 2010022929 A | * | 2/2010 | |
| WO | WO-2016091634 A1 | * | 6/2016 | .......... B01F 13/1027 |

OTHER PUBLICATIONS

Google machine translation "DE-19507181-A1" (Year: 1996).*
Google machine translation for "DE-4341569-A1" (Year: 1995).*
Google machine translation for "EP-569854-A1" (Year: 1993).*
Google machine translation for "JP-2010022929-A" (Year: 2010).*
European office action for patent application No. 18 782 964.3 dated Jul. 7, 2021.
International search report for patent application No. PCT/EP2018/076968 dated Jan. 21, 2019.
International preliminary report on patentability for patent application No. PCT/EP2018/076968 dated Mar. 21, 2019.

* cited by examiner

DEVICE FOR TREATING A PRODUCT

BACKGROUND OF THE INVENTION

The invention relates to a device for treating a product in a receiving trough which has at least one opening for receiving the product, the treatment of the product being affected by inner and outer blades which are arranged in the receiving trough and can be driven separately by drive systems.

Mixers for organic masses, especially for meat, are known in many different embodiments on the market. They usually consist of a cylindrical housing with a closed base, in which a shaft is centrally and rotatably mounted, which is driven by an externally mounted motor. On the shaft there is a holding device for blades which on the one hand slide along the bottom and on the other hand along the inner wall of the housing. The housing has a certain capacity and can be either open or firmly closed by means of a bolt which is pivotally mounted on it.

The blades are paddle-shaped in such a way that the mix is mixed by turning the blades. The mixture is poured into the housing as a whole and then mixed in the desired way until all additives substances have been mixed together with the organic mass.

For emptying, the housing will be opened or tipped over so that the mix, similar to a concrete mixer, can be collected in a provided collecting container and fed to other processing operations.

Tumblers are also built on the same basis. The DE 43 41 569 C2 shows a cylindrical container with several mixing arms in which the mixing arms being mounted on one side.

EP 191 119 B1 also shows a cylindrical container in which the mixing arm is mounted on one side.

The disadvantage of these two inventions mentioned above is that the tilting containers are only suitable to a limited extent for industrial production, as the mixing arms, which are mounted on one side only, cannot withstand high loads and are therefore unsuitable for inflexible products.

Furthermore, there have been many tilting mixers on the market for decades which do not have a cylindrical mixing container but a mixing trough with two parallel shafts. One version shows two parallel running mixing shafts equipped with paddles. A second version also has two parallel running mixing shafts but equipped with a Z-arm, which is why this mixer is called a Z-arm mixer.

These mixers are of stable construction with mixing shafts mounted on both sides. However, the drive system occurs only from one side, where the main engine is located. The main engine drives both mixing shafts with chain wheels.

The disadvantage of these mixers is that emptying does not run optimally if the products have different viscosities. This is because the two mixing shafts always have the same mixing speed, which cannot be changed. Furthermore, it is not possible to turn both mixing shafts in the same direction, which would also be advantageous during emptying. As the tilting movement is done by a hydraulic cylinder, there are only two end positions. Either the trough is straight or tilted. The position in the tilted position cannot be varied. These mixers also do not have scrapers and therefore product residues must be laboriously scraped out in the tilted position. Furthermore, these mixers mix too slowly and not as gently.

A mixer described in DE 195 07 181 is designed for the emptying in the area of the front wall and is therefore not suitable for tipping emptying. The existing mixer trough can only be loaded on the long side, as the drive engines are located in the area of the lift-tilt device and are therefore in the way.

SUMMARY OF THE INVENTION

The present invention is now based on the object of showing a device of the type mentioned above which avoids the disadvantages mentioned above, which in particular can be better charged and emptied and whose mixing activity is improved.

To solve this object, on the one hand, the drive for at least one inner blade is arranged on the same side of the receiving trough as the drive for the at least one outer blade.

This arrangement does not impede the lifting/tilting process and makes it more versatile. In particular, it is now possible to operate the pick-up trough from one front end, which makes it easier to operate.

Both drives can preferably be driven independently of one another, which entail many variants in the treatment of the product and better emptying of the container and is therefore also time-saving.

In addition, the drives can also preferably be driven in the same or in the opposite directions, which likewise lead to variable treatment of the product and better emptying of the container, but also optimize the mixing movement and the mixing of the products themselves.

In the preferred embodiment, a drive shaft for the at least one inner blade runs through a hollow shaft for the at least one outer blade. Thus, both wings can be driven independently of one another, which lead to the advantages already mentioned above.

In a further example of the invention, for which separate protection is also sought, a scraper is assigned to the receiving trough. This scraper greatly simplifies the emptying of the receiving trough, which minimizes the scratching effort and thus saves an enormous amount of time.

The scraper of the present invention is, for example, designed like a frame, which minimizes the scraping effort and thus optimizes the emptying of the container.

In addition, the scraper can be connected to the hollow shaft for the outer blade, thus additionally ensuring optimum kneading and mixing of the products.

The connection between the scraper and the hollow shaft can be detachable, so that the individual parts can be cleaned without any problems in accordance with the industry standard.

Likewise, protection is sought for a further example of the invention in connection with the two other exemplary embodiments, but also separately, for the feature that a tilt angle of the receiving trough can be changed by a geared motor. This means that depending on the viscosity of the product, the appropriate angle can be set and optimal emptying can take place.

The geared motor is preferably located on the same side of the receiving trough as at least one drive for at least one blade. Here, too, a good overview and operability is guaranteed. Furthermore, nothing stands in the way of the trolley and the receiving trough. They are therefore free to move freely.

A lifting/tilting device for loading the receiving trough is provided opposite the drives. This arrangement enables particularly simple loading.

Thus the following parameters in particular are fulfilled by the present invention:

Better mixing shaft design for gentle and faster mixing.

Better mixing, as the two shafts rotate independently of one another and the direction of rotation can also be changed as required.

The tilt end position can be changed as required for the product.

The mixer is equipped with scrapers to minimize the scraping effort.

BRIEF DESCRIPTION OF THE DRAWINGS

Further advantages, features and details of the invention can be found in the following description of preferred embodiments and in the drawing, which shows in FIG. 1 is a front view of a device for treating a product in a receiving trough in a position of use, FIG. 2 a front view of a device as shown in FIG. 1 in a further position of use, FIG. 3 a side view of parts of the device according to FIG. 1.

DETAILED DESCRIPTION

Figure 1:
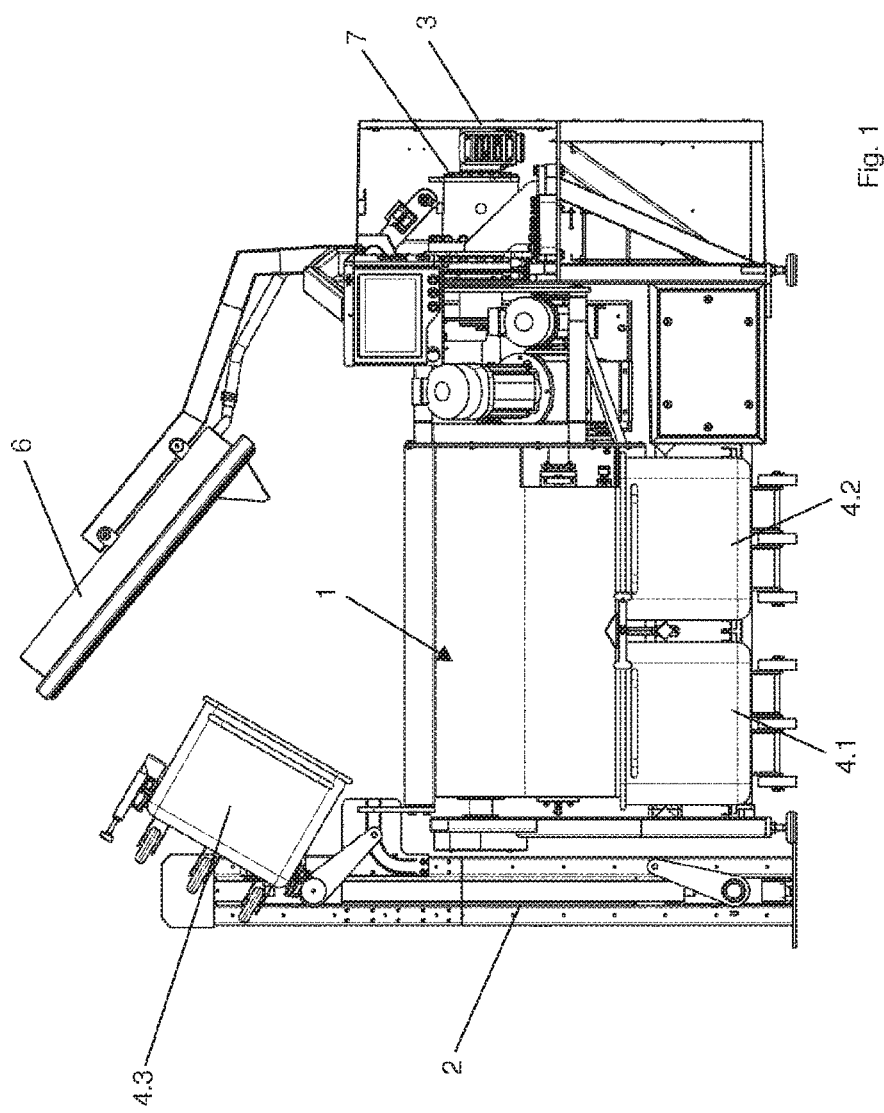

According to FIG. 1, a device according to the invention for treating products, in particular for treating meat products, has a receiving trough 1 which is arranged between a lifting/tilting device 2 and a drive/control unit 3. Two trolleys 4.1 and 4.2 for receiving the treated product are located below the receiving trough 1.

Figure 4:
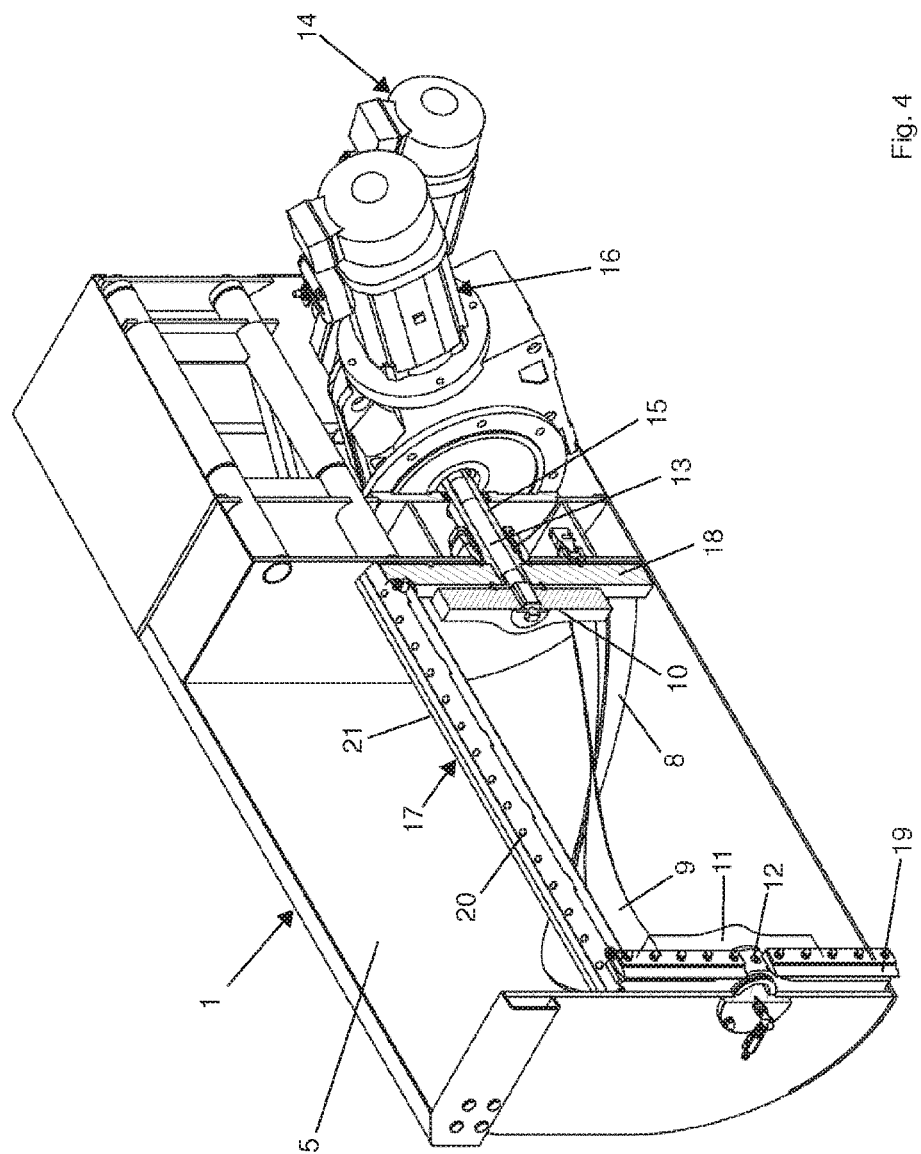
FIG. 4 is a partially cut perspective view of parts of the device as shown in FIG. 1.

The product itself is brought into the receiving trough 1 via a third trolley 4.3, whereby this trolley 4.3 is lifted by means of the lifting/tilting device 2 and tilted, as shown in FIG. 1, so that the product can fall into the receiving trough 1 through an opening 5, see in particular FIG. 4. Once the product has been filled, the receiving trough 1 can be closed by means of a lid 6.

Figure 2:
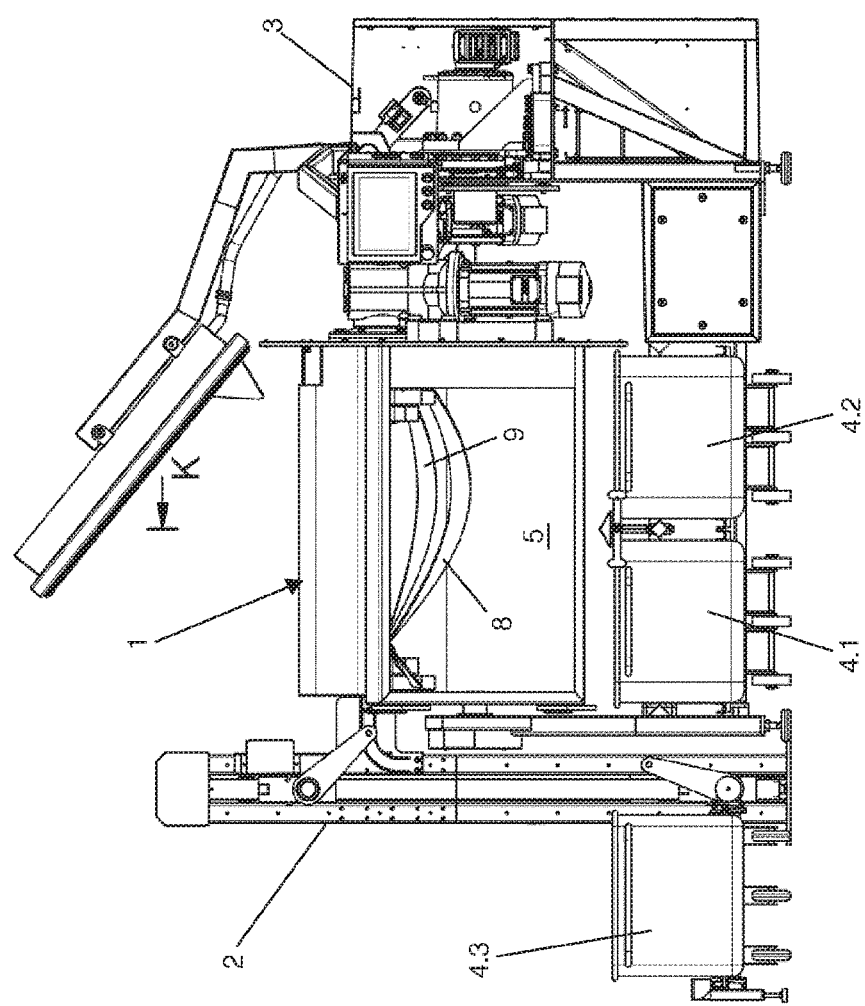
Figure 3:
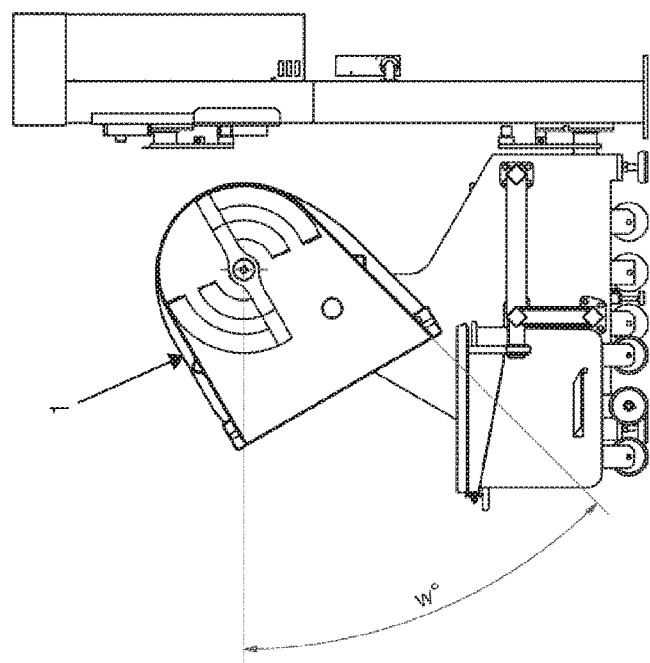

The drive/control unit 3 contains a geared motor 7, which is arranged approximately linearly with the receiving trough 1. This geared motor 7 causes the tipping of the receiving trough 1, as shown in particular in FIG. 3. However, the geared motor 7 itself is not shown there. However, the geared motor 7 has the decisive advantage that an angle w, within the range of which the receiving trough 1 can be tilted, can be selected as required. FIG. 2 shows the receiving trough 1 in tilted position, whereby a view through the opening 5 is also possible, whereby an outer blade 8 and an inner blade 9 are visible. This is illustrated in more detail in FIG. 4.

In this FIG. 4 it can be seen that the inner blade 9, preferably twisted, extends between an inner beam 10 and an outer beam 11. The outer beam 11 is rotatably mounted in a rotary bearing 12, the inner beam 10 is attached to a shaft 13, which in turn is connected to a drive 14, in particular an electric engine, via a corresponding angular gear not shown in any more detail.

The shaft 13 in turn passes through a hollow shaft 15, which is connected to another drive 16, also preferably an electric engine, via a corresponding angular gear.

The hollow shaft 15 is assigned to the outer blade 8, which is, in the preferred embodiment drawn here, connected to the hollow shaft 15 via a scraper 17. The scraper 17 is at least partially frame-like and has an inner front frame 18 and an outer front frame 19. Both front frames 18 and 19 are connected to each other via a traverse 20 and have only partially shown scraper lips 21.

The functioning of the present invention is as follows:

To load the receiving trough 1, a trolley 4.3 filled with the product is moved over the receiving trough 1 by means of the lifting/tipping device 2, with the lid 6 being raised. This position of use is shown in FIG. 1. In this position of use, the product now falls from trolley 4.3 into the receiving trough 1.

The product is then treated, for example by mixing or kneading. For this purpose, the inner and outer blades 8 and 9 are set in motion via the corresponding drives 14 and 16. The inner and outer blades 8 and 9 can be operated at the same or different speeds, in the same or opposite directions.

As soon as the product has been sufficiently treated, the receiving trough 1 is rotated by means of the geared motor 7 to an emptying position, as indicated for example in FIG. 2. By further turning in particular the outer blade 8, possibly together with the scraper 17, the product is discharged into trolleys 4.1 and 4.2. It should be emphasized that it is conceivable that the scraper 17 could also be operated independently of the outer blade 8, in which case appropriate decoupling devices are provided.

The invention claimed is:

1. A device for treating a product in a receiving trough (1) which has at least one opening (5) for receiving the product, the product being treated by means of at least one inner blade (9) and an outer blades (8) which are arranged in the receiving trough (1) and can be driven separately via first and second drives (14; 16), wherein the receiving trough (1) is a tiltable receiving trough (1), a tilting angle (w) of the receiving trough (1) being variable by a geared motor (7), wherein the at least one inner blade (9) extends between an inner beam (10) and an outer beam (11), the outer beam (11) being rotatably mounted in a pivot bearing (12) and the inner beam being mounted on a shaft (13) which is connected to the first drive (14) via an angular gear, wherein the shaft (13) passes through a hollow shaft (15) which is associated with the outer blade (8) and connected to the second drive (16) via a further angular gear, and wherein the first drive (14) for the at least one inner blade (9) is arranged on the same side of the receiving trough (1) as the second drive (16) for the at least one outer blade (8).

2. The device according to claim 1, wherein a scraper (17) is provided in the receiving trough (1).

3. The device according to claim 1, wherein the geared motor (7) is arranged on the same side of the receiving trough (1) as at least one of the first or second drives (14; 16).

4. The device according to claim 1, wherein the first and second drives (14; 16) can be driven independently of one another.

5. The device according to claim 1, wherein the first and second drives (14; 16) can be driven in the same direction or in opposite directions.

6. The device according to claim 2, wherein the scraper (17) comprises a frame defined by two front frames (18, 19) and a traverse (20) connecting the two front frames.

7. The device according to claim 2, wherein the scraper (17) is connected to the hollow shaft (15) for the outer blade (8).

8. The device according to claim 7, wherein a connection between the scraper (17) and the hollow shaft (15) is detachable.

9. The device according to claim 1, further comprising a lifting/tilting device for loading the receiving trough (1) opposite the first and second drives (7; 14; 16).

\* \* \* \* \*